United States Patent
Sun et al.

(10) Patent No.: US 7,752,789 B2
(45) Date of Patent: Jul. 13, 2010

(54) DISPLAY DEVICE

(75) Inventors: Ke Sun, Shenzhen (CN); Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 350 days.

(21) Appl. No.: 11/869,752

(22) Filed: Oct. 10, 2007

(65) Prior Publication Data

US 2008/0134550 A1    Jun. 12, 2008

(30) Foreign Application Priority Data

Dec. 8, 2006    (CN)    .................... 2006 1 0201242

(51) Int. Cl.
| | |
|---|---|
| H05K 7/16 | (2006.01) |
| G09F 11/00 | (2006.01) |
| F25D 25/02 | (2006.01) |
| A47B 88/00 | (2006.01) |
| A47B 95/00 | (2006.01) |
| A47B 81/00 | (2006.01) |
| A47B 97/00 | (2006.01) |
| A47B 1/04 | (2006.01) |
| A47B 1/02 | (2006.01) |
| A47F 5/08 | (2006.01) |
| A47H 15/00 | (2006.01) |

(52) U.S. Cl. ................. 40/491; 361/727; 312/298; 312/301; 312/223.2; 108/70; 108/73; 108/75; 108/76; 108/78; 108/86; 211/151; 49/362; 49/360; 49/322; 49/125; 49/127; 49/128; 49/130; 16/97; 160/206

(58) Field of Classification Search ............... 40/491; 361/681, 727; 312/298, 301, 223.2; 108/70, 108/73, 75, 76, 78, 86; 211/151; 49/362, 49/360, 32, 125, 127, 128, 130; 16/97; 160/206
See application file for complete search history.

(56) References Cited

U.S. PATENT DOCUMENTS

| | | | | |
|---|---|---|---|---|
| 3,309,816 | A | * | 3/1967 | Malone, Jr. .................. 49/127 |
| 2006/0082518 | A1 | | 4/2006 | Ram |
| 2007/0277442 | A1 | * | 12/2007 | Dery et al. .................... 49/362 |

* cited by examiner

*Primary Examiner*—Lesley Morris
*Assistant Examiner*—Syed A Islam
(74) *Attorney, Agent, or Firm*—Frank R. Niranjan

(57) ABSTRACT

An exemplary display device includes a support member, a pair of displays slidably attached to the support member, and positioning members disposed between the displays and the support member. The support member includes a straight slideway, and a curved slideway defined therein. The curved slideway includes a slanting portion, and a first straight portion and a second straight portion extending out from opposite ends of the slanting portion. The straight slideway is parallel to the first straight portion of the curved slideway and in line with the second straight portion of the curved slideway. The displays are slidably received in the straight slideway and the curved slideway respectively. The displays may be positioned to form a large screen, or slid to overlap leaving a single display visible.

18 Claims, 6 Drawing Sheets

DISPLAY DEVICE

BACKGROUND

1. Field of the Invention

The present invention relates to a display device.

2. Description of Related Art

Most personal computers (PCs) employ a single, flat screen to display graphics and/or data thereon. The single screen is adequate for use by one person sitting nearby.

However, usually, a typical display can only be rotated horizontally and with a fixed size in the frame, and it can't satisfy the user if the user needs to sit further away from the screen.

Consequently, what is required is a display device with an expandable screen.

SUMMARY

In one embodiment, a display device includes a support member, a pair of displays slidably attached to the support member, and positioning members disposed between the displays and the support member. The support member includes a straight slideway, and a curved slideway defined therein. The curved slideway includes a slanting portion, and a first straight portion and a second straight portion extending out from opposite ends of the slanting portion. The straight slideway is parallel to the first straight portion of the curved slideway and in line with the second straight portion of the curved slideway. The displays are slidably received in the straight slideway and the curved slideway respectively. The displays may be positioned to form a large screen, or slid to overlap leaving a single display visible.

Other advantages and novel features of the present invention will become more apparent from the following detailed description of preferred embodiment when taken in conjunction with the accompanying drawings, in which:

DETAILED DESCRIPTION

Figure 1:
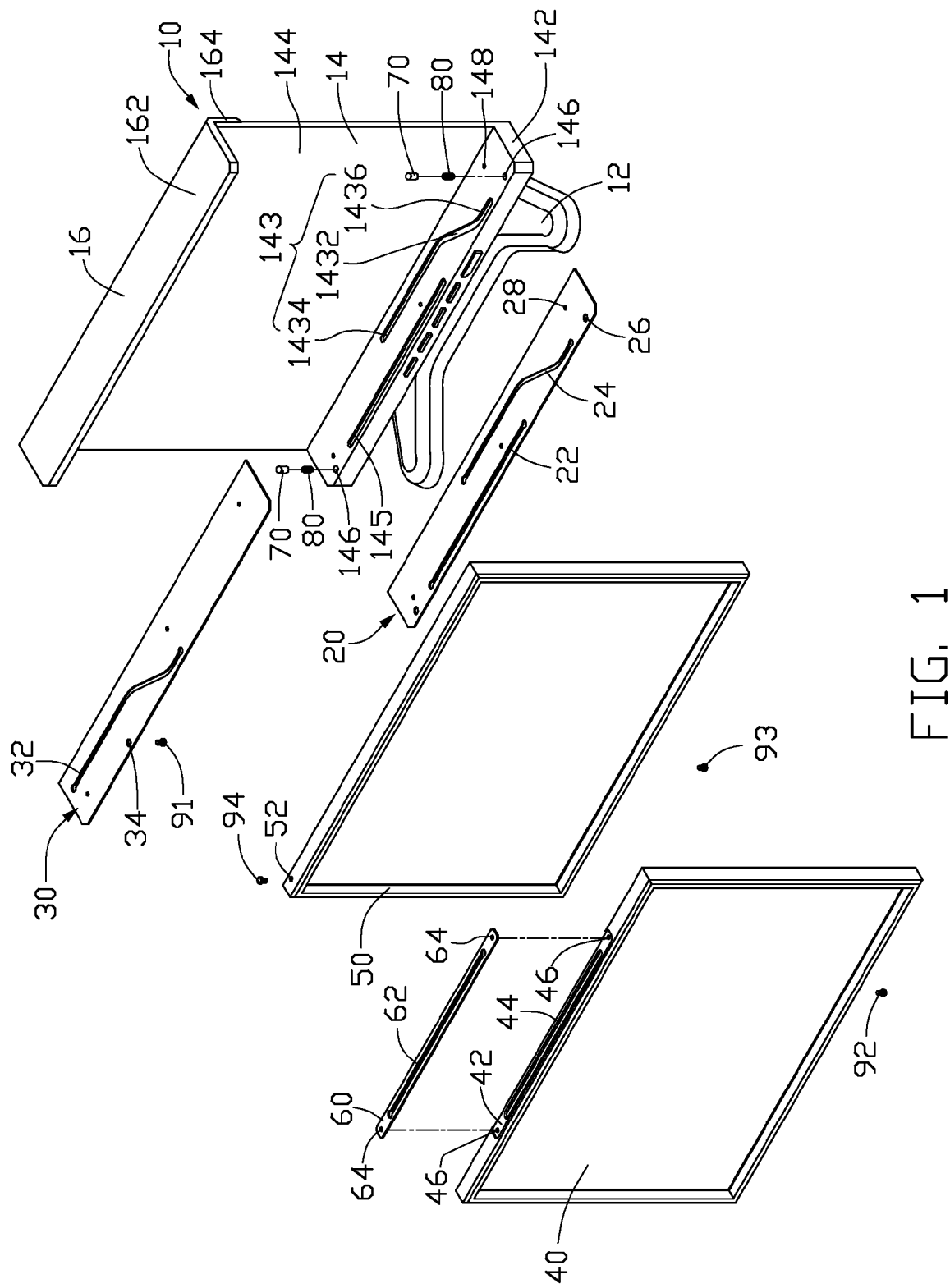
FIG. 1 is an exploded, isometric view of a display device according to an embodiment of the present invention, the display device includes a support member, a first fixing board, a second fixing board, a pair of locating pins, and a pair of displays.
Figure 2:
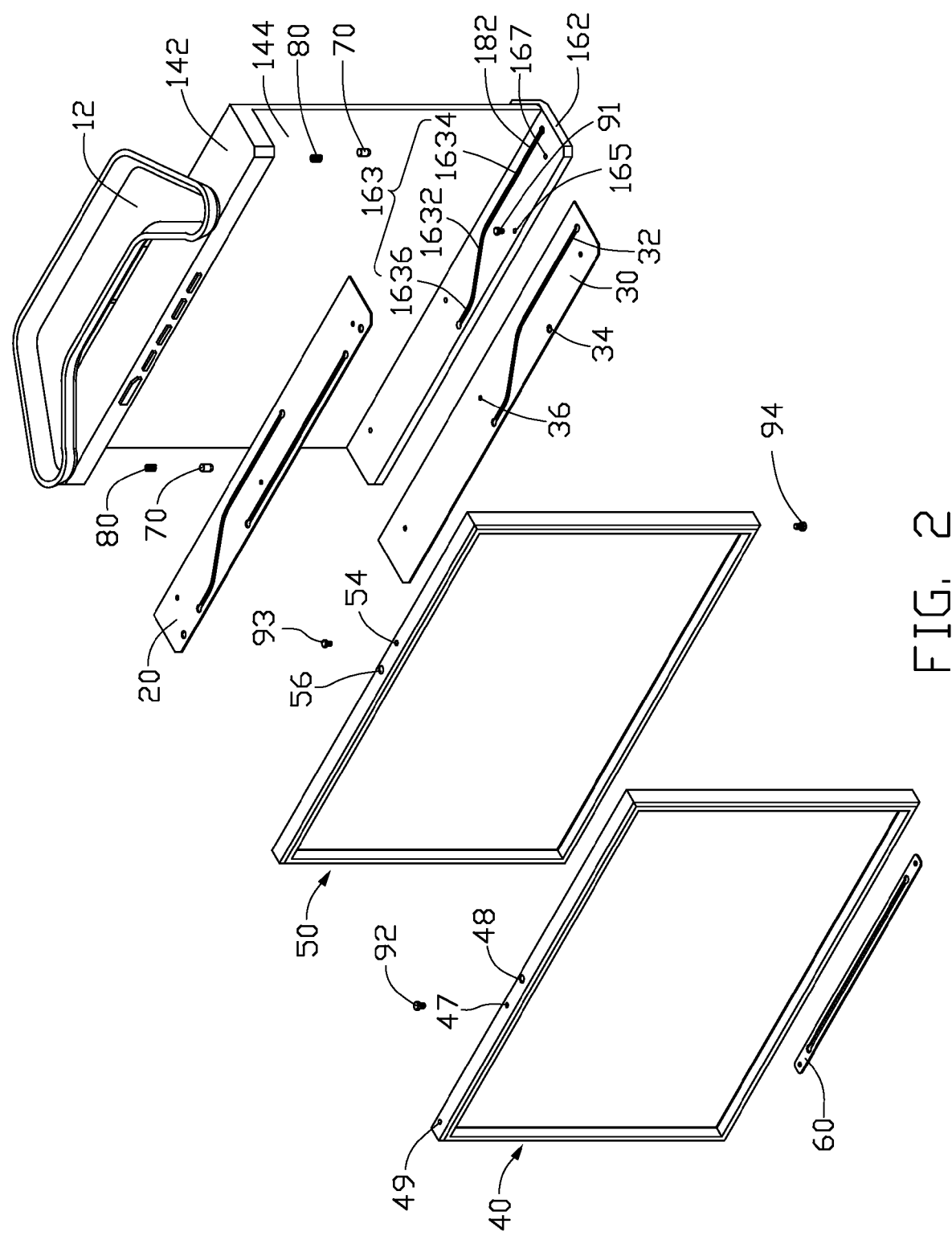
FIG. 2 is an inverted view of FIG. 1.

Referring to FIGS. 1 and 2, in a preferred embodiment of the invention, a display device includes a support member 10, a first fixing board 20, a second fixing board 30, a first display 40, a second display 50, a fixing bar 60, a pair of pins 70, a pair of resilient members 80, a slide member 91, a first guide member 92, a second guide member 93, and a third guide member 94.

The support member 10 includes a pedestal 12, a first frame 14, and a second frame 16. The first frame 14 has an L-shaped configuration and includes a horizontal plate 142, and a vertical plate 144. The second frame 16 also has an L-shaped configuration and includes a horizontal plate 162, and a vertical plate 164. The vertical plate 164 of the second frame 16 is attached to an upper portion of the vertical portion 144 of the first fixing frame 14, and the horizontal plate 142 of the first frame 14 is attached to a top of the pedestal 12. The first frame 14 and the second frame 16 cooperatively define a U-shaped receiving space to receive the first display 40 and the second display 50.

The horizontal plate 142 of the first frame 14 includes a curved slideway 143 defined in a right portion thereof along an inside edge thereof, a straight slideway 145 defined therein along an outside edge thereof, a pair of receiving holes 146 respectively defined in two ends thereof, and a plurality of fixing holes 148 defined therein. The curved slideway 143 includes a long straight portion 1434 parallel to the inner edge of the horizontal plate 142, a slanting portion 1432 extending from a right end of the long straight portion 1434 toward the outer edge of the horizontal plate 142, and a short straight portion 1436 extending from a right end of the slanting portion 1432 along the outer edge of the horizontal plate 142. The long straight portion 1434 is offset from the short straight portion 1436. The slanting portion 1432 is connected between the right end of the long straight portion 1434 and the left end of the short straight portion. The straight slideway 145 is parallel to the long straight portion 1434 of the curved slideway 143 and is in end-to-end alignment with the short straight portion 1436 of the curved slideway 143. The receiving holes 146 are configured for receiving the resilient members 80 and the pins 70 therein.

Referring also to FIG. 2, the horizontal plate 162 of the second frame 16 includes a curved slideway 163 defined in a left portion thereof, a threaded hole 165 defined therein along an outside edge thereof, and a plurality of fixing holes 167. The curved slideway 163 includes a slanting portion 1632, a long straight portion 1634 extending from a left end of the slanting portion 1632, and a short straight portion 1636 extending from a right end of the slanting portion 1632. The long straight portion 1634 of the curved slideway 163 is parallel to the straight slideway 145. The short straight portion 1636 of the curved slideway 163 is in line with the straight slideway 145.

Referring to FIG. 1, the first fixing board 20 has a similar configuration as the horizontal plate 142 of the first frame 14 and includes a curved slideway 24, a straight slideway 22, a pair of through holes 26 corresponding to the receiving holes 146 of the first frame 14, and a plurality of through holes 28 corresponding to the fixing holes 148 of the first frame 14, defined therein. The curved slideway 24 has a similar shape as, but is narrower than, the curved slideway 143 of the first frame 14 of the support member 10. The straight slideway 22 has a similar shape as, but is narrower than, the straight slideway 145 of the first frame 14 of the support member 10. An entrance is formed at each end of the curved slideway 24 and the straight slideway 22, to allow one of the guide members 92, 93, 94 entering thereinto.

The second fixing board 30 has a similar configuration as the horizontal plate 162 of the second frame 16 and includes a curved slideway 32 in a left portion thereof, a through hole 34 corresponding to the threaded holes 165 of the second frame 16, and a plurality of through holes 36, corresponding to the fixing holes 167 of the second frame 16. The curved slideway 32 has a similar shape as, but is narrower than, the curved slideway 163 of the second frame 16 of the support member 10. Similarly, an entrance is formed at each end of the curved slideway 32.

Referring to FIGS. 1 and 2, the first display 40 includes a lengthwise recessed portion 42 in a top wall thereof. The recessed portion 42 is for receiving the fixing bar 60 therein and includes a long slot 44 defined therein, and a pair of fixing holes 46 defined beside two ends of the long slot 44. The first display 40 includes a threaded hole 47, a first positioning hole 48, and a second positioning hole 49 defined in a bottom wall thereof. The first positioning hole 48 and the second positioning hole 49 are located beside two sides of the threaded hole 47. The second positioning hole 49 is at a left end of the bottom wall of the first display 40.

Referring to FIGS. 1 and 2, the second display 50 includes a threaded hole 52 defined in a left end of a top portion thereof. The second display 50 includes a positioning hole 56 defined in a middle portion of a bottom wall thereof, and a threaded hole 54 beside a left side of the positioning hole 56 in the bottom wall thereof.

The fixing bar 60 has a similar configuration with the recessed portion 42 of the first display 40 and includes a straight slideway 62, and a pair of through holes 64 defined therein beside the straight slideway 62. The straight slideway 62 has a similar shape as, but is narrower than, the slot 44 of the first display 40. An entrance is formed at each end of the straight slideway 62.

In this preferred embodiment, the resilient members 80 are coil springs.

Figure 3:
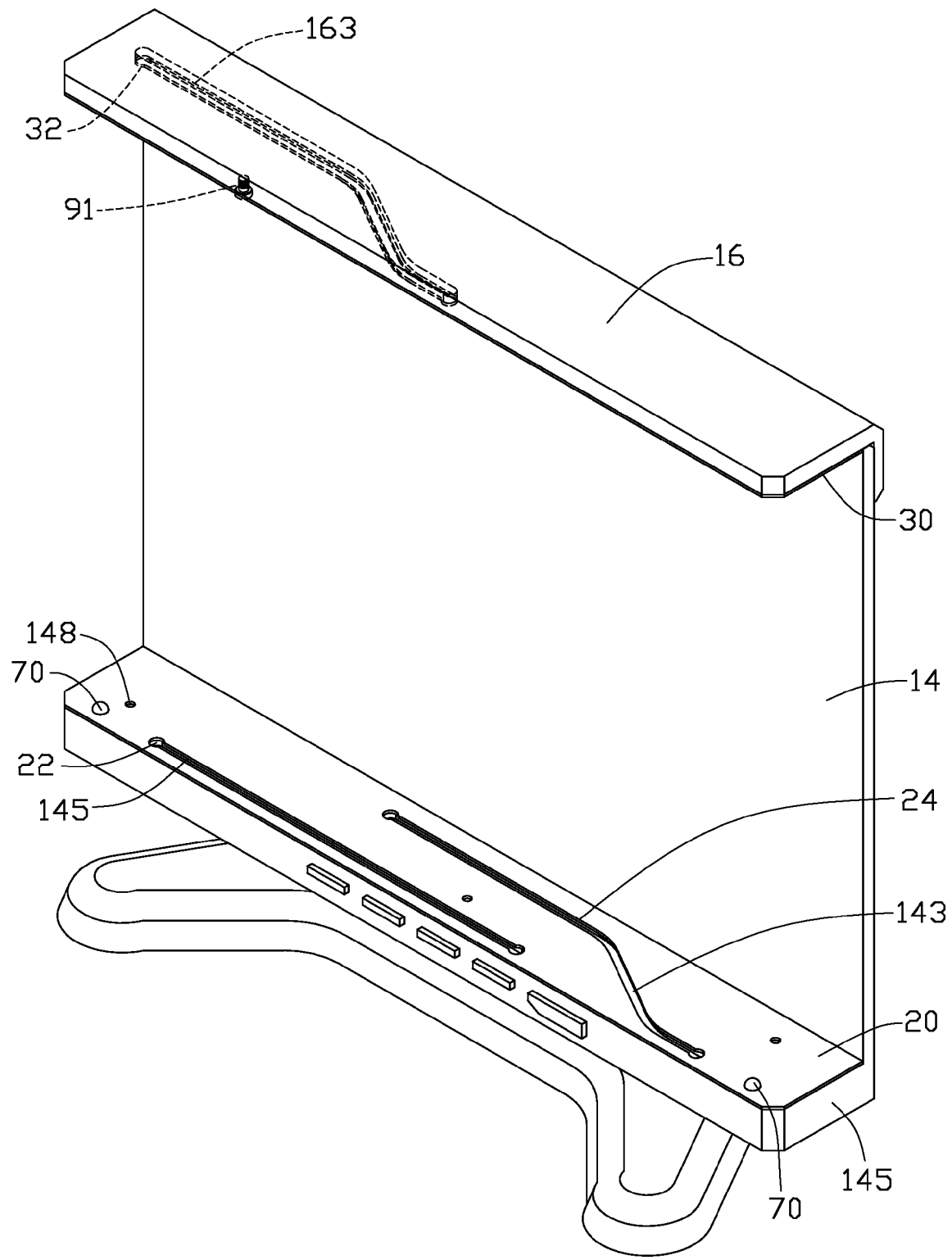
FIG. 3 is a partially assembled view of FIG. 1, showing the first fixing board, the second fixing board, and the locating pins attached to the support member.

Referring also to FIG. 3, each of the pins 70 has a hemispherical head for facilitating entering into the positioning holes 48, 49 of the first display 40 or the positioning hole 56 of the second display 50.

In this preferred embodiment, the slide member 91, the first guide member 92, the second guide member 93, and the third guide member 94 are thumb screws.

Figure 4:
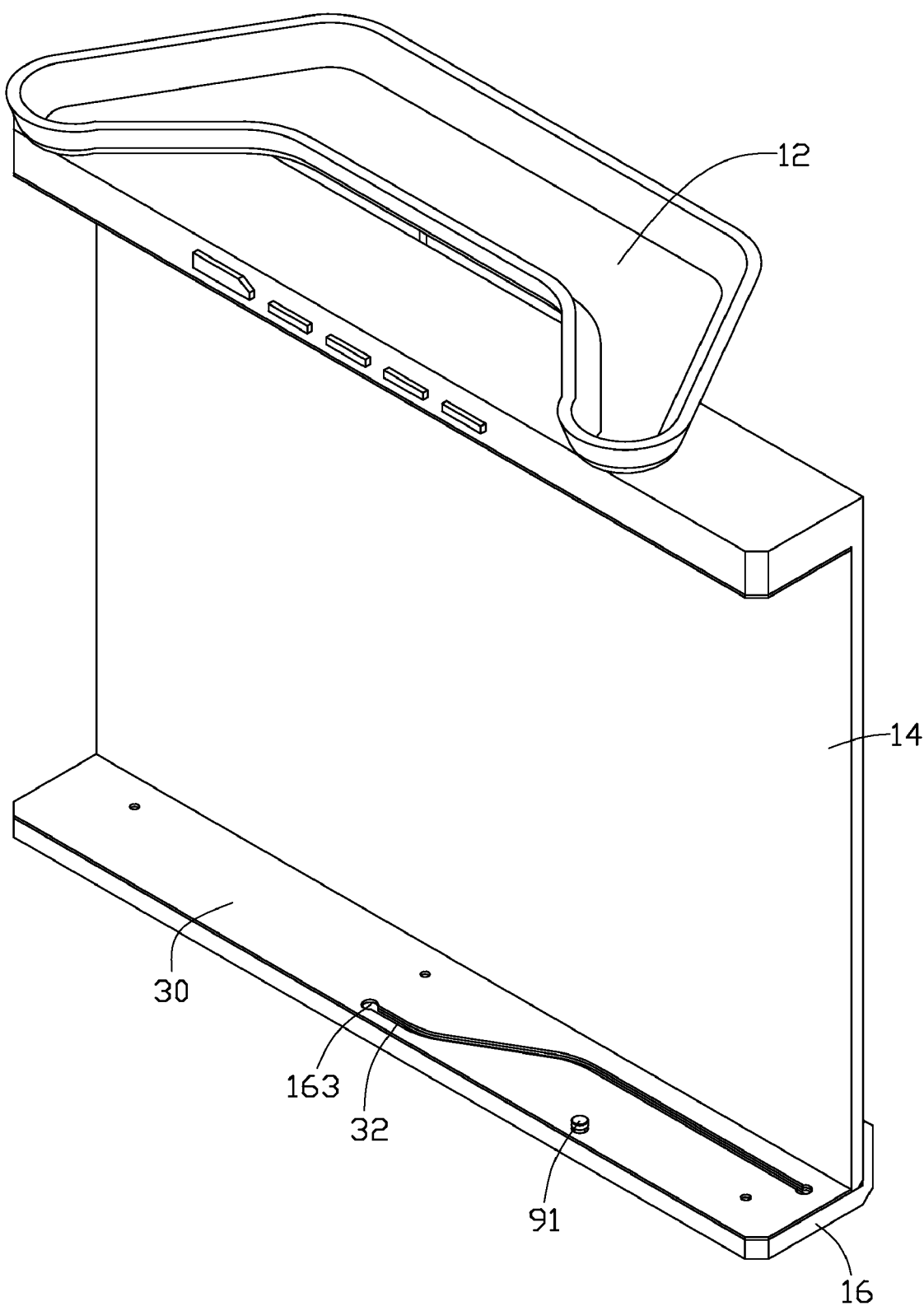
FIG. 4 is an inverted view of FIG. 3.
Figure 5:
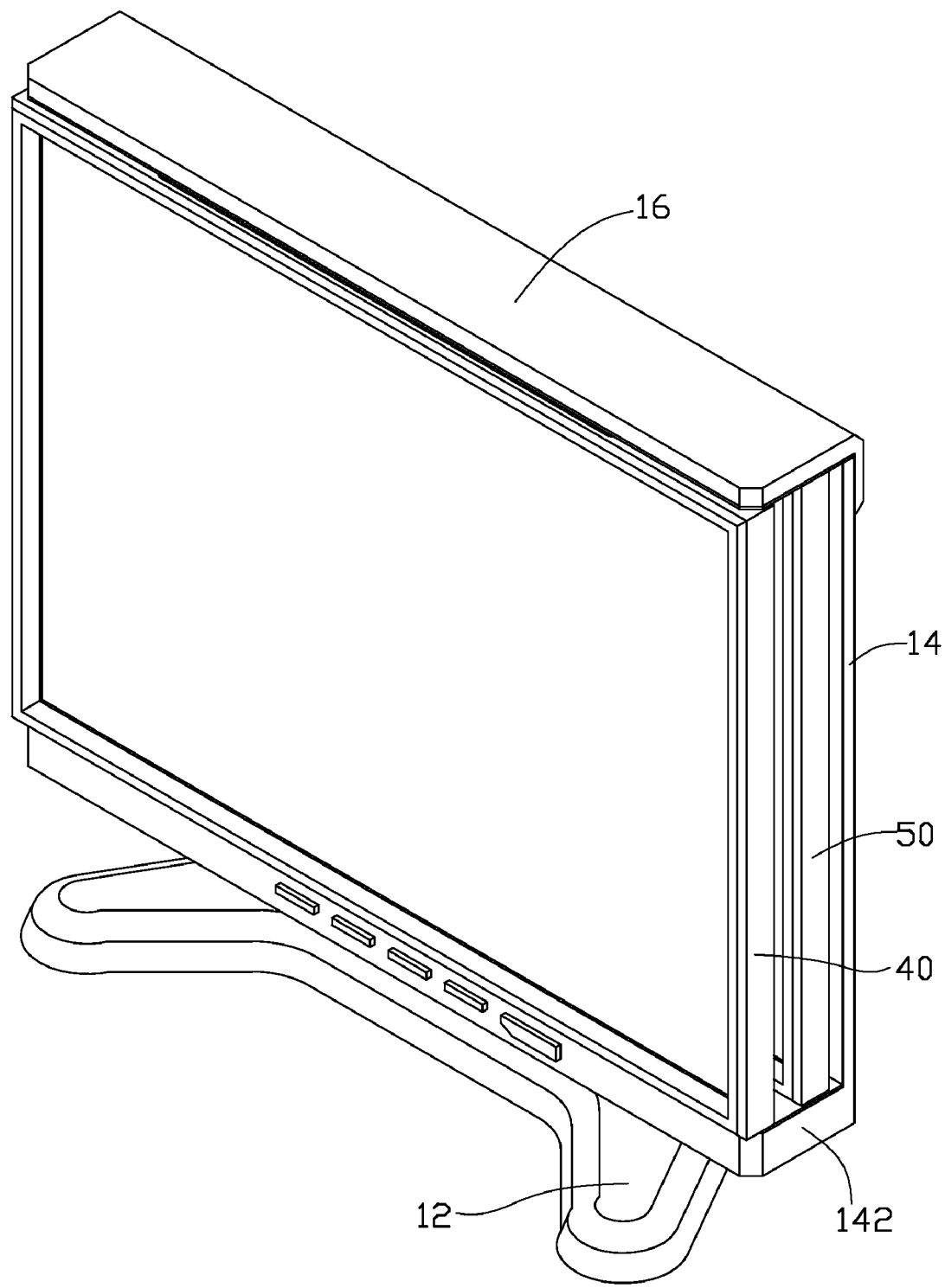
FIGS. 5 and 6 are assembled, isometric views of the display device of FIG. 1, respectively showing the displays of the display device in an overlapped state and an extended state.

Referring to FIGS. 3 to 5, in assembly, the first fixing board 20 is attached to the horizontal plate 142 of the first frame 14 of the support member 10, with a plurality of rivets (not shown) extending through the through holes 28 of the first fixing board 20 and the fixing holes 148 of the horizontal plate 142 of the first frame 14. The pins 70 are fixed with the resilient members 80 therearound and extend through the through holes 26 of the first fixing board 20 and engage in the receiving holes 146 of the horizontal plate 142 of the first frame 14, respectively, with the heads thereof located above the first fixing board 20. The second fixing board 30 is attached to the horizontal plate 162 of the second frame 16 of the support member 10, with a plurality of rivets (not shown) extending through the through holes 36 of the second fixing board 30 and the fixing holes 167 of the horizontal plate 162 of the second frame 16. The slide member 91 extends through the through hole 34 of the second fixing board 30 and engages in the threaded hole 165 of the second frame 16.

The first guide member 92 engages in the threaded hole 47 of the bottom wall of the first display 40. The fixing bar 60 is retained in the recessed portion 42 of the first display 40, with a pair of rivets extending through the through holes 64 of the fixing bars 60 and engaging in the fixing holes 46 of the first display 40. The straight slideway 62 of the fixing bar 60 aligns with the slot 44 of the first display 40.

The second guide member 93 engages in the threaded hole 54 of the bottom wall of the second display 50. The third guide member 94 engages in the threaded hole 52 of the top wall of the second display 50.

The first display 40 is attached to the support member 10, with the first guiding member 92 attached to the first display 40 selectively extending through one of the entrances of the straight way 22 of the first fixing board 20 to be slidably received in the straight slideway 145 of the first frame 14. The bottom wall of the first display 40 depresses a left one resilient member 80 and forces a corresponding left one pin 70 into a corresponding left one receiving hole 146 of the first frame 14.

The second display 50 is attached to the support member 10, with the second guide member 93 attached to the second display 50 selectively extending through one of the entrances of the curved slideway 24 of the first fixing board 24 to be slidably received in the curved slideway 143 of the first frame 14. The assembled second frame 16 and the second fixing board 30 are attached to the first frame 14, with the vertical plate 164 of the second frame fixed with a top portion of the vertical plate 144 of the first frame by conventional fasteners. The exposed portion of the slide member 91 selectively extends through one of the entrances of the straight slideway 62 of the fixing bar 60 attached to the top wall of the first display 40 and is slidably received in the slot 44 of the first display 40. The third guide member 94 selectively extends through one of the entrances of the curved slideway 32 of the second fixing board 30 and is slidably received in the curved slideway 163 of the horizontal plate 162 of the second frame 16. The bottom wall of the first display 50 depresses a right one of the resilient members 80 and abuts against a right one of the pins 70 into a right one of the receiving holes 146 of the first frame 14.

Figure 6:
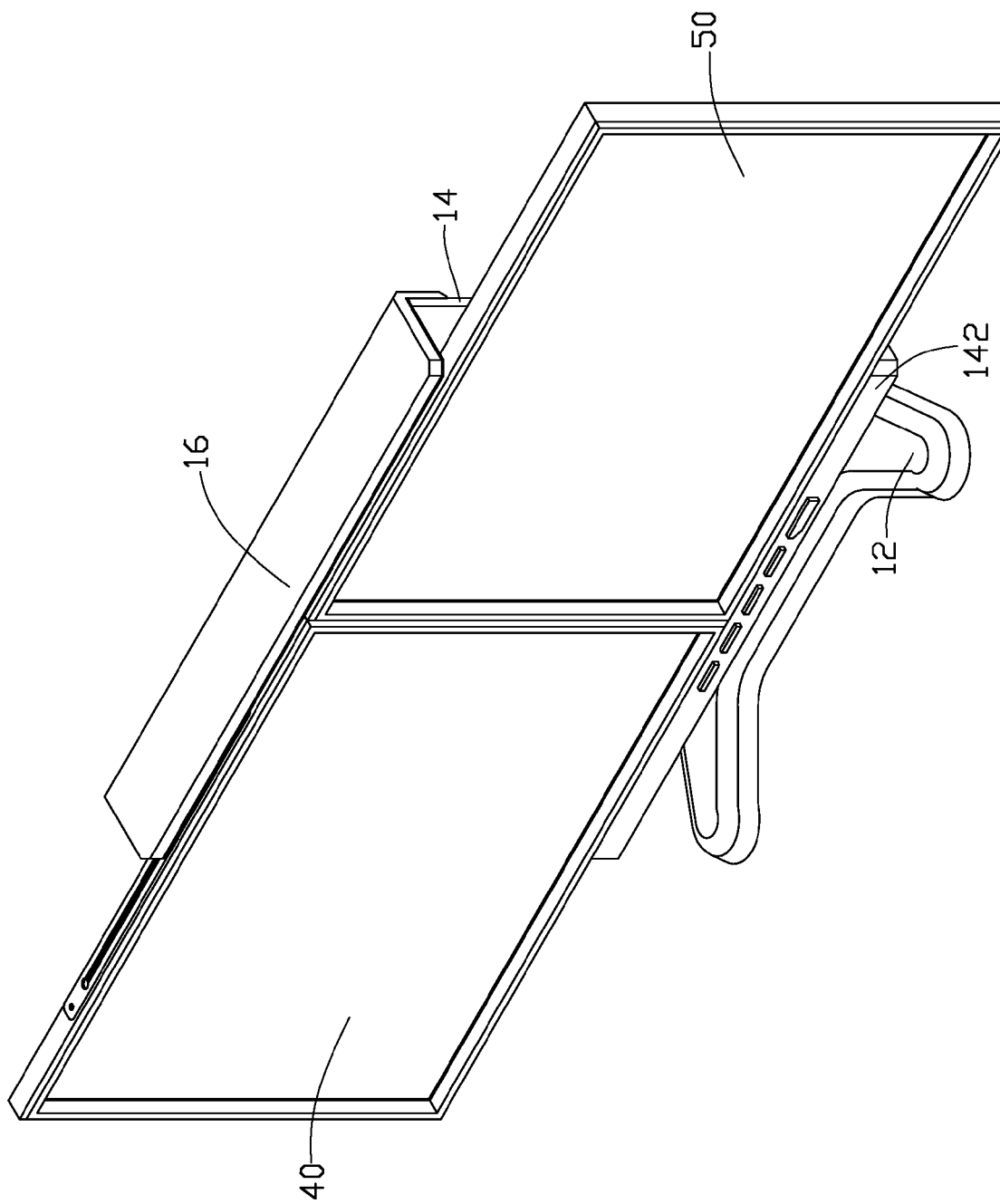

Referring also to FIGS. 5 and 6, to extend the display device, the first display 40 is drawn leftward. The first guide member 92 slides leftward in the straight slideway 145 of the first frame 14. The slot 44 of the first display 40 slides leftward relative to the slide member 91. When the first positioning hole 48 defined in the bottom wall of the first display 40 aligns with the left one of the pins 70, so that, the corresponding spring 80 rebounds. The head of the left pin 70 snaps into the first positioning hole 48 to position the first display 40 in the left-and-right direction. At the same time, the second display 50 is drawn rightward. The second guide member 93 attached to the bottom wall of the second display 50 slides rightward in the curved slideway 143 of the first frame 14 and the third guide member 94 attached to the top wall of the second display 50 slides rightward in the curved slideway 163 of the second frame 16. The second and third guide members 93, 94 pass the long straight portions 1434, 1634, the slanting portions 1432, 1632 and the short straight portions 1436, 1636 of the curved slideways 143 and 163 in that order. When the positioning hole 56 of the second display 50 aligns with the right one of the pins 70, the head of the right pin 70 extends outward into the positioning hole 56 to position the second display 50 in the left-and-right direction and the corresponding spring 80 rebounds. In this position, a right side of the first display 40 closely contacts with a left side of the second display 50 and the first display 40 and the second display 50 are in coplanar, as a result, cooperatively forming a large screen.

Referring also to FIGS. 5 and 6, to retract the display device, the second display 50 is snappingly pushed leftward. An edge of the positioning hole 56 of the bottom wall of the second display 50 urges the head of the right pin 70 into the right receiving hole 146 of the first frame 14 and depresses the right spring 80. Then, the second guide member 93 of the second display 50 slides leftward in the curved slideway 143 of the first frame 14, and the third guide member 94 of the second display 50 slides leftward in the curved slideway 163 of the second frame 16, passing the short straight portions 1436, 1636, the slanting portions 1432, 1632 and the long straight portions 1434, 1634 of the curved slideways 143 and 163. After that, the first display 40 is snappingly pushed rightward. Edges of the positioning hole 48 located at the bottom wall thereof urge the head of the left pin 70 to push the left pin 70 into the left receiving hole 146 of the first frame 14 and depresses the left spring 80. Then the first guide member 92 attached to the bottom wall of the first display 40 slides rightward in the straight slideway 145 of the first frame 14. The slot 44 of the first display 40 slides rightward relative to the slide member 91 attached to the second fixing board 30 and the second frame 16. When the locating hole 49 located at the bottom of the first display 40 aligns with the right one of the pins 70, the head of the right pin 70 extends outward into the second positioning hole 49 to position the first display 40. In this position, the first display 40 and the second display 50 are overlapped to form a small screen. A right portion of the first display 40 is located in the short straight portion 1436 of the curved slideway 143 to prevent the second display 50 sliding rightward.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A display device comprising: a support member comprising a straight slideway, and a curved slideway defined therein, the curved slideway comprising a slanting portion with two opposite ends, a first straight portion and a second straight portion respectively extending opposite from the two ends of the slanting portion, the first straight portion parallel to and spaced from the straight slideway, the second straight portion in line with the straight slideway; a first display slidably engaging with the straight slideway and a second display slidably engaging with the curved slideway, respectively, the first and second displays being movable oppositely to an extended position where the displays are coplanar with each other to cooperatively form a large screen, the first and second displays being movable toward each other to a retracted position where the displays are overlapped to form a small screen; and a pair of positioning members disposed between the first and second displays and the support member to respectively locate the first and second displays at the extended position and the retracted position, wherein the support member comprises a pedestal, a first frame, and a second frame, the first frame comprises a horizontal plate disposed at a top of the pedestal and a vertical plate, the second frame comprises a horizontal plate and a vertical plate attached to a top of the vertical plate of the first frame, the curved slideway and the straight slideway are defined in the horizontal plate of the first frame.

2. The display device as described in claim 1, wherein each of the positioning members comprises a pin, and a resilient member fixed around the pin, the horizontal plate of the first frame comprises a pair of receiving holes to receive the resilient members and the pins therein, and one of the displays defines a positioning hole receiving one of the pins at the extended position and receiving the other pin at the retracted position.

3. The display device as described in claim 2, wherein each of the pins has a hemispherical head for facilitating entering into the positioning hole of the one of the displays.

4. The display device as described in claim 1, further comprising a pair of guide members attached to bottom walls of the displays to slidably engage in the straight slideway and the curved slideways of the support member respectively.

5. The display device as described in claim 4, further comprising a first fixing plate attached to the horizontal plate of the first frame, wherein the first fixing plate comprises a straight slideway and a curved slideway, narrower than the straight slideway and the curved slideway of the horizontal plate of the first frame, such that the guide members are slidable along the straight slideway and the curved slideway of the first fixing plate but blocked from escaping from the straight slideway and the curved slideway of the horizontal plate, two enlarged entrances respectively disposed at two ends of the straight slideway and the curved slideway of the first fixing plate to allow the guide members entering into the straight slideway and the curved slideway.

6. The display device as described in claim 1, wherein the horizontal plate of the second frame comprises a curved slideway with a similar configuration as and parallel to the curved slideway of the first frame, the curved slideway of the second frame comprises a straight portion, a slide member is attached to a top wall of one of the displays engaging with the curved slideway of the first frame and is slidaby engaged with the curved slideway of the second frame.

7. The display device as described in claim 6, further comprising a second fixing plate attached to the horizontal plate of the second frame, wherein the second fixing plate comprises a curved slideway defined therein, narrower than the curved slideway of the second frame and having entrances disposed at ends of the straight slideway and the curved slideway of the first fixing plate to allow the guide members entering into the straight slideway and the curved slideway.

8. The display device as described in claim 1, wherein a guide member is attached the horizontal plate of the second frame, a slot is defined in a top wall of one of the displays engaging with the straight slideway of the first frame to slidably engage with the guide member.

9. The display device as described in claim 8, further comprising a fixing bar attached to the top wall of the display engaging with the straight slideway of the first frame, wherein the fixing bar comprises a straight slideway narrower than the slot, two enlarged entrances respectively are disposed at two ends of the straight slideway to allow the guide members entering into the straight slideway.

10. A display device comprising:
a support member comprising a straight slideway, a curved slideway, and a pair of holes, the curved slideway comprising a slanting portion, a first straight portion and a second straight portion extending opposite from two ends of the slanting portion, the first straight portion parallel to and spaced from the straight slideway, the second straight portion in line with the straight slideway;
a first display attached to the support member and being slidable along the straight slideway in a left-and-right direction between a retracted position and an extended position and comprising a pair of positioning holes defined in a bottom wall thereof;
a second display attached to the support member and being slidable along the curved slideway in the left-and-right direction between a retracted position and an extended position and comprising a positioning hole defined in a bottom wall thereof;
a pair of positioning members engaged in the holes of the support member and being movable in an up-and-down direction relative to the support member, one of the positioning members engaging in one of the positioning holes of the first display when the first and second displays are at the extended position, the other one of the positioning members engaging in the other one of the positioning holes of the first display when the first and second displays are at the retracted position and engaging in the positioning hole of the second display when the first and second displays are at the extended position.

11. The display device as described in claim 10, wherein each of the positioning members comprises a pair of pins, and a pair of resilient members fixed around the pins respectively configured for urging the pins being selectively received in the positioning holes of the first and second displays.

12. The display device as described in claim 10, further comprising a pair of guide members attached to the bottom walls of the first and the second displays to slidably engage in the straight slideway and the curved slideways of the support member respectively.

13. The display device as described in claim 10, wherein the support member comprises a pedestal, a first frame, and a second frame, the first frame comprises a horizontal plate disposed at a top of the pedestal and a vertical plate, the second frame comprises a horizontal plate and a vertical plate attached to a top of the vertical plate of the first frame, the curved slideway and the straight slideway are defined in the horizontal plate of the first frame.

14. The display device as described in claim 12, wherein the horizontal plate of the second frame comprises a curved slideway with a similar configuration as and parallel to the curved slideways of the first frame, the curved slideway of the second frame comprises a straight portion in line with the straight slideway of the first frame, a slide member is attached to a top wall of the second display to slide in the curved slideway of the second frame.

15. The display device as described in claim 12, wherein a guide member is attached the horizontal plate of the second frame, a slot is defined in a top wall of the first display to slidably engage with the guide member.

16. A display device comprising: a support member comprising a bottom plate and a top plate parallel to the bottom plate; a pair of first and second displays attached between the bottom plate and the top plate; a pair of first slideways in a left-and-right direction being defined between the first display and the top and bottom plates such that the first display is slidable along the first slideways between a retracted position and an extended position; a pair of second slideways being defined between the second display and the top and bottom plates and each comprising two opposite ends spaced from each other in a front-and-back direction and the left-and-right direction such that the second display is slidable along the second slideways between a retracted position where the second display is hidden at backside of the first display when the first display is at the retracted position and an extended position where the second display is coplanar with the first display which is at the extended position; and a pair of positioning members disposed on the support member to respectively locate the first and second displays when the first and second displays are at the extended positions, wherein the first display when at the retracted position, is located by the positioning members and blocks the second display moving from the retracted position to the extended position.

17. The display device as described in claim 16, wherein each of the second slideways comprises a slanting portion with two opposite ends, a first straight portion and a second straight portion respectively extending opposite from the two ends of the slanting portion, the first straight portion parallel to and spaced from the first slideway in the front-and-back direction, the second straight portion in line with the first slideway.

18. The display device as described in claim 16, wherein one of the first slideways and one of the second slideways are defined at the bottom plate, a pair of guiding members are respectively attached to the first and second displays and slidable along said one of the first slideways and one of the second slideways, a fixing board is attached to a top surface of the bottom plate and defines a pair of limiting slots respectively corresponding to said one of the first slideways and one of the second slideways configured to prevent the guiding members from escaping from said one of the first slideways and one of the second slideways.

* * * * *